(12) United States Patent
Neuberger et al.

(10) Patent No.: US 7,005,623 B2
(45) Date of Patent: Feb. 28, 2006

(54) AUTOCALIBRATING MEDICAL DIODE LASER SYSTEM

(75) Inventors: Wolfgang Neuberger, Labuan (MY); Stefan Spaniol, Bonn (DE)

(73) Assignee: CeramOptec Industries, Inc., East Longmeadow, MA (US)

( * ) Notice: Subject to any disclaimer, the term of this patent is extended or adjusted under 35 U.S.C. 154(b) by 119 days.

(21) Appl. No.: 10/438,513

(22) Filed: May 15, 2003

(65) Prior Publication Data

US 2004/0227056 A1 Nov. 18, 2004

(51) Int. Cl.
*G01J 1/32* (2006.01)
(52) U.S. Cl. .................................. 250/205; 250/559.1
(58) Field of Classification Search ................ 250/205, 250/559.1, 227.11, 227.14; 606/9, 10, 13
See application file for complete search history.

(56) References Cited

U.S. PATENT DOCUMENTS 4,994,059 A * 2/1991 Kosa et al. .................... 606/12
5,798,518 A 8/1998 Coleman et al.
6,587,482 B1 * 7/2003 Kato ............................ 372/9

* cited by examiner

*Primary Examiner*—Que T. Le
(74) *Attorney, Agent, or Firm*—BJ Associates; Bolesh J. Skutnik

(57) ABSTRACT

Briefly stated, the present invention discloses a novel device that automatically calibrates and adjusts the intensity, dosage, and other parameters of a radiation delivery system and radiation source based on selected or detected radiation delivery systems. Such radiation delivery systems include optical fiber systems, and any type of diffuser, as well as bare fiber tips. The functions of a radiation source and a calibration device are combined by storing the characteristics of a wide variety of delivery system types and brands and calibrating the radiation based on those stored characteristics. In a preferred embodiment, a calibration sheath is provided that fits over a delivery system, such as a bare fiber tip or a diffuser at the distal end of a fiber, to both protect the system during calibration and direct output radiation to a detector. In another embodiment, one or more detectors are situated on the interior surface of the calibration sheath to directly measure at least a preselected portion of the emitted radiation. Power readings are directed to a calibration subsystem from the detector or detectors, which then adjusts the emitted power to conform to desired treatment parameters. The need for different calibration devices based on the characteristics of the delivery system is alleviated.

24 Claims, 3 Drawing Sheets

AUTOCALIBRATING MEDICAL DIODE LASER SYSTEM

BACKGROUND OF THE INVENTION

1. Field of the Invention

The invention relates generally to a device and method for auto-calibration of lasers with any number of radiation delivery systems.

2. Invention Disclosure Statement

Laser systems in the medical field are used for a myriad of purposes, utilizing complex and diverse target surfaces, power levels, and dosage levels and rates. In applications of Photodynamic Therapy (PDT), for example, it is critical that actual dosage rates closely match the desired rate for the particular target on the body. In addition, different irradiation systems are used for different treatments. Cylindrical diffusers, bare fibers, and lensed-tip diffusers are just a few of the many diffusion systems that are used in different applications of PDT to ensure effectiveness for the specific treatment sought.

In many applications of PDT and other laser treatments, a system that allows for a single laser source to serve a variety of purposes with different radiation delivery systems for different treatments, including diffusers if needed, is desired. In many cases, one laser source suffices for treatment of a variety of ailments and other related medical problems, provided that different radiation delivery systems or diffusers are available to ensure the effectiveness of each treatment. Therefore, calibration of the output of laser systems with varying radiation delivery systems is critical to the success and safety of the treatment.

Calibration of power levels for different radiation delivery systems or diffusers is difficult, and, at the least, extremely time consuming. In general, the prior art utilizes flat power meters to test lensed tips and bare fiber systems, whereas an integrating sphere is used for calibration of a cylindrical or spherical tip or other types of extended sources such as balloons. It was not considered feasible in the prior art to develop a device capable of calibrating the output of any number of differing diffusers. Diffusers alter the power and/or intensity of a laser source at different levels, making calibration of different laser diffusion systems a difficult task. For example, U.S. Pat. No. 5,798,518 (Coleman et. al) provides a method for calibration of bare fibers by shunting off a certain portion of the laser for calibration and then rejoining the diffusion, based on successful calibration. A safety shutter would open inside the calibration device based on successful testing of the laser. This application of the prior art works only on bare fibers, or perhaps lensed-tip fibers. In any event, there is no ability in the prior art to calibrate dosage or intensity requirements of different radiation delivery systems utilizing one single calibration laser system. Generally, if a single laser system has different delivery systems capable of attaching and emitting from single laser source, a calibration device must be on hand for each system to ensure proper and desired emission of radiation from each system when it is used. This solution is time consuming and costly.

The present invention provides a novel medical laser treatment system with an integrated subsystem capable of calibrating power and dosage levels of the radiation based on the distal end used for each treatment. The source and calibration subsystem are generally an integrated unit, with a mechanism to allow selection or auto-recognition of a wide variety of diffusers to ensure proper calibration of the laser based on the diffuser used. The present invention allows for a single device or system to be used for a wide variety of treatments.

OBJECTIVES AND BRIEF SUMMARY OF THE INVENTION

It is an object of the present invention to allow for a single laser radiation source to be calibrated with one device for use with a wide variety of radiation delivery systems, including diffusers or diffusion systems.

It is a further object of the present invention to integrate all tools and calculation functions to provide a compact, portable, and easy to use solution.

It is still another object of the present invention to provide a source device with an emission source or port capable of recognizing a variety of radiation delivery systems or diffusers to ensure proper calibration of the radiation based on the diffusion and energy transmission qualities of the delivery system.

It is yet a further object of the present invention to provide a radiation source with an integrated calibration device that allows for manual selection of a delivery system type by way of a heads-up display or similar apparatus.

It is yet another object of the present invention to provide a calibration sheath capable of securing the proximal end of disparate delivery systems or diffuser types and brands to minimize energy loss and ensure accurate calibration.

It is still a further object of the present invention to allow for memory storage of the characteristics of various delivery systems or diffusers to ensure proper calibration based on the characteristics and age of a delivery system.

It is another object of the present invention to provide an input means for uploading the characteristics of new diffusers that did not exist at the creation of specific realizations of the present invention.

Briefly stated, the present invention discloses a novel device that automatically calibrates and adjusts the intensity, dosage, and other parameters of a radiation delivery system and radiation source based on selected or detected radiation delivery systems. Such radiation delivery systems include optical fiber systems, and any type of diffuser, as well as bare fiber tips. The functions of a radiation source and a calibration device are combined by storing the characteristics of a wide variety of delivery system types and brands and calibrating the radiation based on those stored characteristics. In a preferred embodiment, a calibration sheath is provided that fits over a delivery system, such as a bare fiber tip or a diffuser at the distal end of a fiber, to both protect the system during calibration and direct output radiation to a detector. In another embodiment, one or more detectors are situated on the interior surface of the calibration sheath to directly measure at least a preselected portion of the emitted radiation. Power readings are directed to a calibration subsystem from the detector or detectors, which then adjusts the emitted power to conform to desired treatment parameters. The need for different calibration devices based on the characteristics of the delivery system is alleviated.

The above, and other objects, features and advantages of the present invention will become apparent from the following description read in conjunction with the accompanying drawings, (in which like reference numbers in different drawings designate the same elements).

DETAILED DESCRIPTION OF PREFERRED EMBODIMENTS

Figure 1:
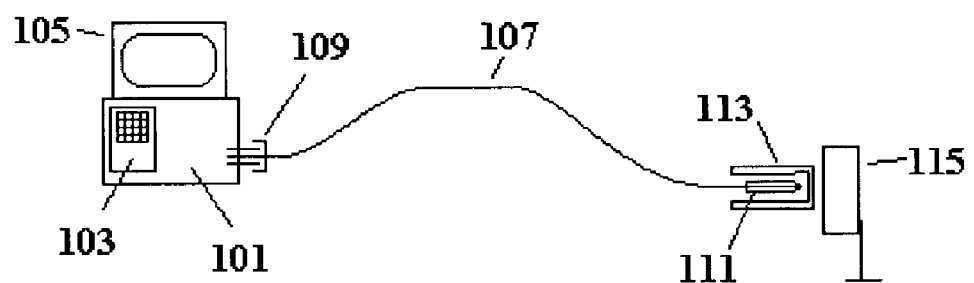
FIG. 1—Illustration of an embodiment of the present invention featuring a calibration sheath.

The prior art fails to provide a method or device for calibration of a laser source that takes various laser delivery methods into account. A laser source with one or more delivery systems or diffusers generally requires just as many calibration devices as delivery systems. As stated earlier, this solution generally increases cost and the time consumed in preparing lasers for actual treatment of patients, and thus decreases the efficiency of the device.

The present invention alleviates the need for separate calibration devices for each separate delivery system. By incorporating an automatic calibration subsystem into a standard laser radiation source, there is no need for a plurality of calibration devices or for single uses of calibration devices that then need to be removed for actual treatment of patients. The present invention comprises one or more photodetectors to read output radiation power, a calibration subsystem, and a calibration sheath to direct at least a preselected portion of radiation to the calibration subsystem and to protect the treatment area and radiation delivery system and shield users from radiation during calibration, among other functions. The calibration subsystem comprises means to calculate proper dosage and adjust power output, and means for storing identification and treatment information. The present invention further comprises means to transmit radiation information from the detector(s) to the calibration subsystem. Also included is an identification tag attached to radiation delivery devices, and a means to identify specific delivery systems and relay identification information to the calibration subsystem.

In one preferred embodiment, the calibration subsystem includes a microprocessor incorporated into the laser source assembly, along with software designed to calibrate the radiation delivery system and source based on identification information and desired treatment parameters. In another preferred embodiment, a selection screen is attached or integrated into the body of the laser source and equipped with means to input information such as a keypad or direct selection on the screen. A further embodiment provides for a desktop computer connected to the laser source. The selection screen allows a user to input a variety of information that is taken into account by the calibration subsystem in setting the laser power. The selection screen queries for treatment type (e.g. carcinoma, periodontitis, mole, or other selections), location (bladder, oral cavity, or other selections), type of delivery or diffusion system, preferred power density, size of treatment area, and other critical information prior to selection of power level. Some of this information need only be given initially, such as preferred power density, because the calibration subsystem stores such information for use in subsequent procedures.

The calibration subsystem may also contain a safety shutter that stays closed, covering the emission port or blocking the radiation by some other means to protect patients, operators and the delivery system, until the calibration and other internal safety procedures are performed. Only upon performance of those safety features will the shutter open and allow for emission of radiation.

In another preferred embodiment, the present invention is equipped with an identification sensor for automatic detection of disparate types of delivery systems or diffusers along with stored characteristics of the diffuser used to auto calibrate the laser source. This sensor may be positioned with the calibration sheath, radiation detector, laser source, radiation connector or laser source emission port, or other location deemed appropriate. In conjunction with the sensor, each delivery system is equipped with an identification tag such as a microchip. The sensor automatically detects the identification information. After auto detection, the laser source auto calibrates based on the characteristics of that delivery system or based on treatment parameters. Certain characteristics, such as the age of the system and certain specific patient information, may require alterations of the dosage rate. Therefore, those characteristics may require manual input into and/or adjustments to the calibration subsystem. The hardware on the system automatically detects readable information about the distal end of the delivery device, by way of data passed across the connection, or by other means. Any other necessary information about the distal end and other aspects of the treatment or operation are manually inputted or electronically stored and transferred to the memory of the calibration subsystem. Alternatively, each delivery device or diffuser is equipped with a data sheet or electronic copy of its characteristics and performance that is automatically or manually transferred to the memory of the radiation source. This transmission need only occur once. When a delivery device or diffuser is attached once, the characteristics of that device or diffuser are permanently stored in the memory of the radiation source.

In a preferred embodiment, the subsystem calibrates the laser source based upon power readings through the delivery system that are read by at least one radiation detector. Such a detector can be integrated into the identification sensor described above so that the detector can read both power emission and identification information. In this way, if the proper power settings for a given diffuser with a given treatment area or wavelength are not sufficiently known, the present invention can properly calibrate the device.

As contemplated by the present invention, a radiation delivery system encompasses any device or method for delivering treatment radiation to a specific body area. In many preferred embodiments, a radiation delivery system will incorporate an optical fiber to transmit radiation from a source to a treatment area. The delivery system often contains means for creating a specific distribution of emitted radiation. The distribution means may be an emission area of an optical fiber, or a device with illumination optics or other features designed to produce a specific emission pattern or radiation distribution. Additionally, a plurality of types of devices for emitting radiation from the distal end of an optical fiber are contemplated for use with the present invention. These devices include, but are not limited to, a bare fiber tip, shaped fiber tips, and a variety of types of diffusers. Examples of diffusers include cylindrical diffusers, spherical diffusers and balloon diffusers.

Another important aspect of the present invention is the calibration sheath. To direct source radiation to the detector, a calibration sheath is provided to encompass the fiber tip, diffuser or other type of delivery system. This calibration sheath is constructed from a reflective or scattering material so that at least a preselected portion of the radiation is directed to the detector, and also so that radiation does not escape from the interior of the sheath during calibration procedures due to safety reasons. Furthermore, the calibration sheath protects the diffuser from environmental contamination during calibration, thus ensuring sterility. The calibration sheath measures power output in two general ways. In a first embodiment, the sheath encompasses all or part of emitted radiation that is detected by one or more photodetectors in the sheath that convert the optical energy into electrical impulses which are read by the calibration subsystem. In a second embodiment, the calibration sheath directs the treatment radiation to an external detector for power reading. The detector or detectors may be connected physically to the calibration subsystem so that information can be transmitted to the calibration subsystem in the form of electric or optical signals. In another embodiment, the detector may transmit information remotely to the calibration subsystem, for example with radio frequency (RF) signals. The following descriptions are more detailed examples of calibration sheaths contemplated by the present invention.

In one embodiment, the sheath is shaped in such a way as to generally conform to the radiation output shape of a certain class of fibers or delivery systems. For example, a sheath is provided to direct radiation from cylindrical diffusers or tips that emit a radially symmetric output shape. In this embodiment, the radiation is directed axially along the fiber length to the detector. The total output power of the fiber is then relayed to the calibration subsystem via the detector. The calibration subsystem then calculates the energy density based on known diffuser/tip geometries. The calculated value is then compared to preferred treatment parameters. If these values are different, the calibration subsystem adjusts the source power until output readings correspond to preferred parameters.

Another embodiment is preferably used if the interface to the laser unit is desired to be electrical, rather than optical, as in the previous example. The following description uses cylindrical emissions as a model, although embodiments for other symmetrical emissions are envisioned and are modified in a way that will become apparent. In this embodiment, a cylindrical diffuser is encased in a cylindrical calibration sheath. Upon emission during calibration, at least a preselected portion of the radiation is read by the photodetector(s). These readings are relayed to the calibration subsystem, which calculates the emitted power density based on the photodetector's area. As above, the reading is compared to the preferred parameters and power is adjusted accordingly.

Either the calibration sheath is matched in such a manner to the diffuser output that the same power results from all different diffusers via the respective calibration sheath or the recognition of the laser delivery system by the laser unit takes care of the differences. By recognizing the laser delivery system, the calibration system can compare the expected power output based on the type of delivery system with the actual measured power output. Based on this information, the calibration subsystem can then adjust the laser source to achieve the optimal power density to be applied to a treatment area.

Additionally, because the detectors need not detect all of the emitted radiation, but may be set to detect only a preselected portion of the radiation, the calibration sheath can be easily used with many types of diffusers or other means to distribute radiation. Information regarding the preferred emission distribution for a given distribution means is entered into the calibration subsystem, and the expected portion of the radiation power incident on the detector or detectors can be easily determined. Upon initiation of the calibration process, the actual power incident on the detector(s) is measured and compared to the expected power, and the radiation source can be adjusted if needed.

After calibration, the calibration sheath is removed from the radiation distribution means of the delivery system so that it does not hamper the flow of radiation to affected tissue during treatment. In one embodiment, the calibration sheath can be removed prior to insertion of the catheter or fiber into the body. In this embodiment, the calibration sheath is separate from the catheter or removable from the catheter assembly. Another embodiment allows for in vivo calibration of the delivery system. In this embodiment, the calibration sheath is incorporated into a catheter through which the treatment fiber is inserted. After calibration, a shutter or other means for opening the sheath is activated, allowing the diffusion system or fiber tip to be further directed away from the sheath and the distal end of the catheter before treatment. In this way, the delivery system can be calibrated immediately prior to irradiation, alleviating the step of removing the calibration sheath prior to treatment.

Based on the auto-detected or manually inputted characteristics of the diffuser and the operation to be performed, the source selects a desired power level and density for the operation. The power level or density may also be inputted directly, for example, in the case of a well-known operation where the desired power level is known. Based on this desired power level, the calibration subsystem performs a calibration. The calibration operation is performed without any external emission of radiation, as the exact characteristics of the radiation are not known until the calibration is complete. Safety considerations preclude the emission of radiation until calibration is complete. The calibration subsystem also contains a built-in safety device to determine the age of the external diffusers or other delivery systems, ensuring that no radiation is emitted through worn or otherwise unsafe mechanisms. After all calibration and safety checks are complete, the device is prepared for actual treatment.

Preferred embodiments are illustrated in the following figures. FIG. 1 depicts a laser source and calibration system as described in the present invention. Laser source 101 is equipped with calibration subsystem 103 that regulates the power output of source 101 depending on information supplied by the user or the calibration system. The user is capable of entering parameters such as treatment type, treatment area, and power requirements via input screen assembly 105 consisting of a display screen and input means such as a keypad. Optical fiber 107 is coupled with source 101 via connector 109. At the distal end of fiber 107 is diffuser 111, through which treatment radiation is delivered to the treatment area. Calibration sheath 113 surrounds diffuser 111, to protect both users and the diffusion system during calibration and to direct treatment radiation to detector 115. Radiation detected by detector 115 is read by calibration unit 103, which correctly calibrates laser power generated by source 101.

Figure 2:
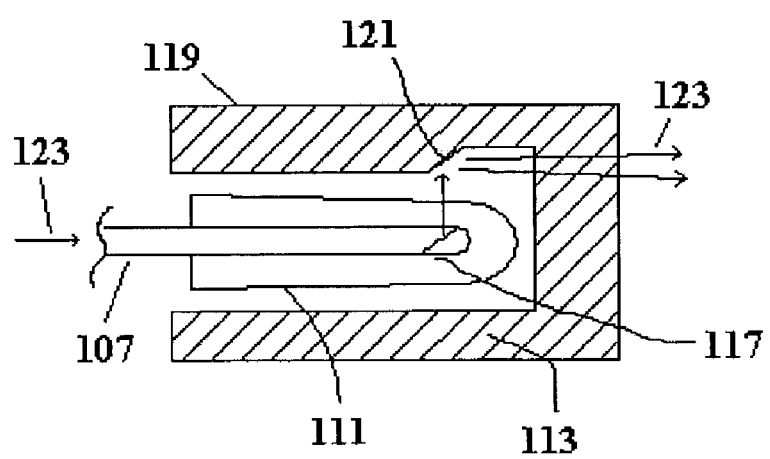
FIG. 2—Cross-sectional view of a calibration sheath and a fiber optic distal tip.

FIG. 2 illustrates one preferred embodiment of the calibration sheath/fiber assembly in greater detail. Diffuser 111 encompasses the tip of fiber 107, which in turn is encompassed or surrounded by calibration sheath 113. The tip of fiber 107 is chiseled to form side fiber 117, which serves to direct the radiation in a direction perpendicular to the axis of fiber 107. Calibration sheath 113 consists of outer protective surface 119 to protect the surrounding environment from radiation and to protect and maintain the sterility of the fiber or diffusion system, and inner reflective surface 121 to prevent treatment radiation from escaping the area bounded by sheath 113 and to direct radiation toward, in this embodiment, a single power meter. Radiation 123 travels from the source to the tip of fiber 107, where it is directed perpendicularly to the axis of fiber 107. Reflective surface 121 then redirects radiation 123 toward the detector, which will then feed the power information back to the calibration subsystem.

Figure 3:
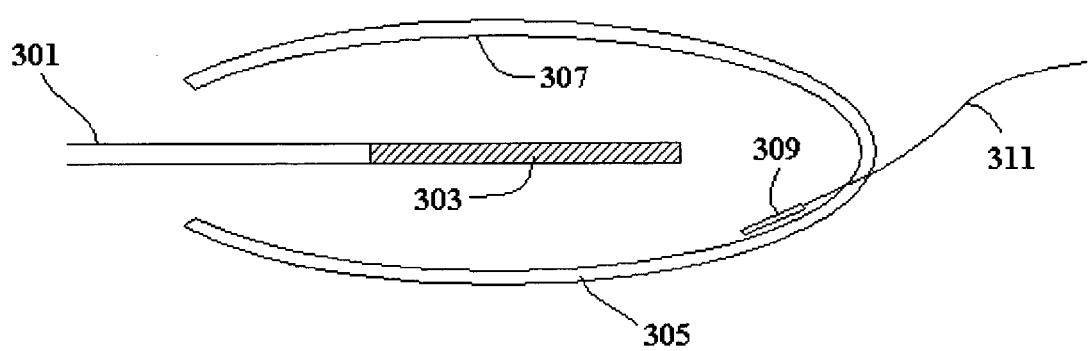
FIG. 3—Illustration of another embodiment of a calibration sheath.

Another preferred embodiment of the calibration sheath/fiber assembly is illustrated in FIG. 3. Optical fiber 301 is coupled to a suitable radiation source at its proximal end, and features emission area 303, which may be, for example, a distribution means such as a diffuser, at its distal end. The distal end of fiber 301 is inserted into calibration sheath 305 so that sheath 305 surrounds emission area 303. Calibration sheath 305 consists of interior reflective/scattering surface 307, radiation detector 309, and signal line 311. Signal line 311 may relay optical or electric signals to the calibration subsystem, or may not be necessary if the signals are relayed to the calibration subsystem remotely. Interior reflective/scattering surface 307 of calibration sheath 305 is shaped to direct at least some portion of the emitted radiation to detector 309. Detector 309 then converts the detected radiation into a signal that is then relayed to the calibration subsystem by signal line 311 or by other means.

Figure 4:
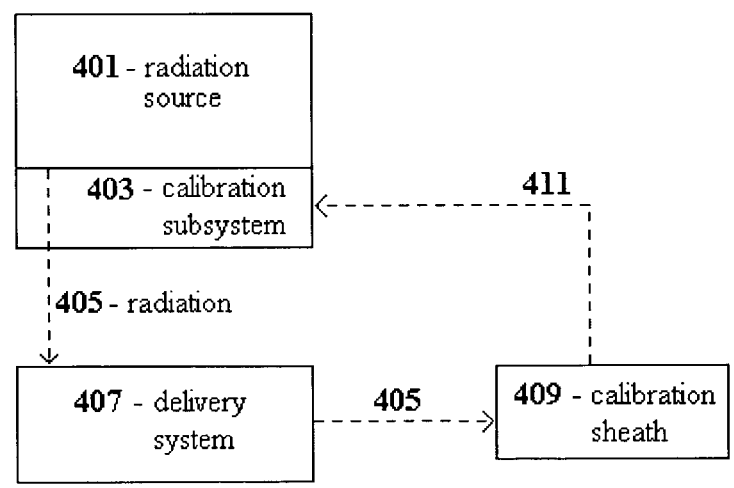
FIG. 4—Schematic diagram of a preferred embodiment of the present invention.

The calibration and monitoring subsystem is demonstrated in operation via the schematic diagram of FIG. 4. Radiation source 401 is connected to calibration subsystem 403. Radiation 405 is emitted from source 401 and coupled to radiation delivery system 407, where it is emitted (via a selected distribution means) into movable calibration sheath 409. Radiation is detected by suitable detector(s) in calibration sheath 409, and that information is relayed to calibration subsystem 403 via signal 411, which may be, for example, an electrical, optical or RF signal. Calibration subsystem 403 determines whether the parameters of the radiation emitted from delivery system 407 are within preselected levels. If not, calibration system 403 alters the power emitted by source 401 and again receives feedback from calibration sheath 409. This cycle can be performed as many times as needed to ensure that delivery system 407 is emitting radiation with the proper parameters for a given treatment.

Figure 5:
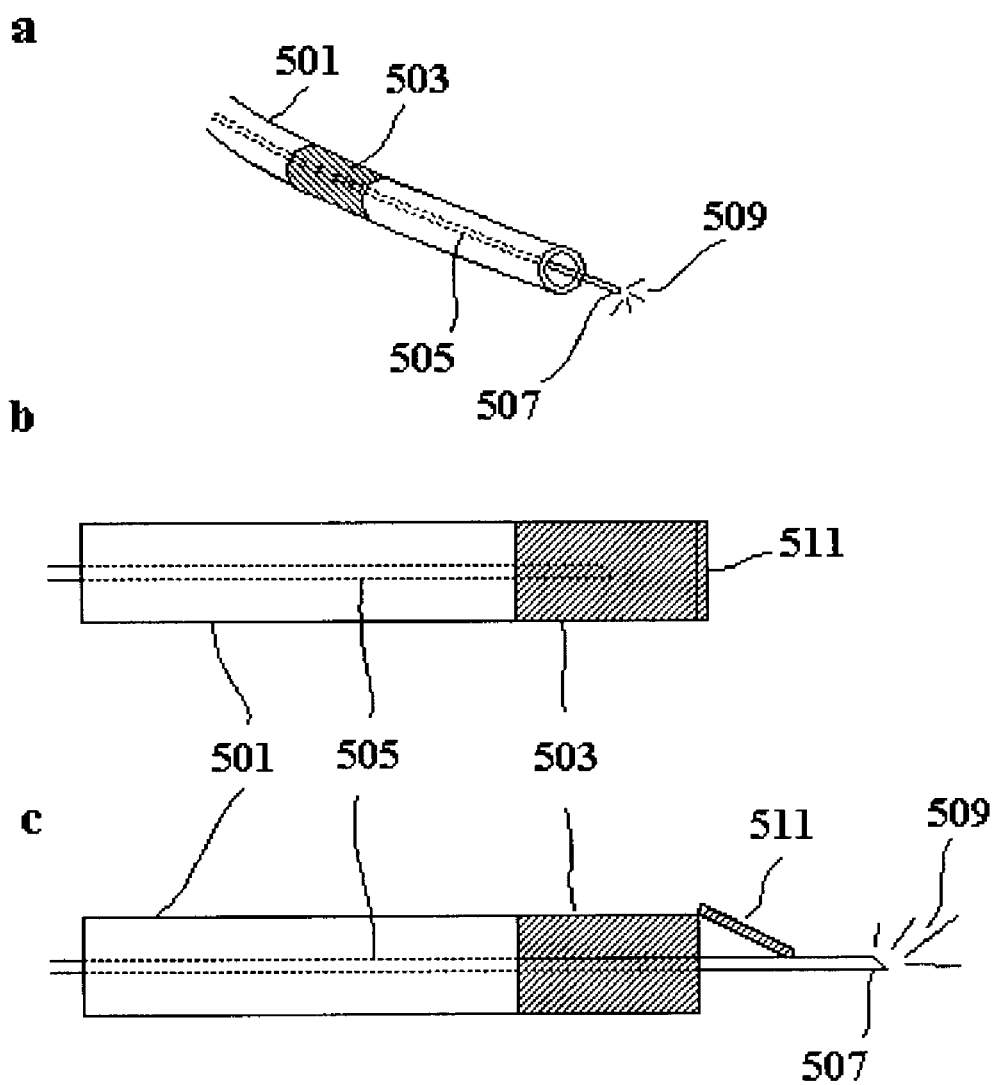
FIG. 5—Illustration of an embodiment featuring a catheter.

Another preferred embodiment is illustrated in FIGS. 5a–c. This embodiment, primarily intended for treatment of internal body areas, utilizes a catheter through which an optical fiber or other device is introduced into an interior body treatment area. Catheter 501, which is inserted into the body, contains calibration sheath 503 for measuring the output of the distal end of optical fiber 505. Calibration sheath 503 consists of an array of photodetectors lining the interior of sheath 503 that receive radiation and transmit radiation information to the calibration subsystem. Distal end 507 may be the bare tip of the fiber or may include a diffuser or some other means for controlling output radiation 509. One preferred embodiment of the catheter is illustrated in FIG. 5a, which may be more suitable for cylindrical diffusers or other delivery means where radiation emission in the direction of the fiber axis is insignificant or to be ignored. Calibration sheath 503 is positioned far enough away from the distal end of catheter 501 so that no axial radiation can escape the catheter. Fiber 505 is advanced along the catheter until distal end 507 is surrounded by sheath 503. A radiation source is then activated, and sheath 503 transmits the emission information to a calibration subsystem. If the radiation source is properly calibrated, fiber 505 is advanced beyond the distal end of catheter 501 and treatment is commenced.

Another version, shown in FIGS. 5b and 5c, illustrates another embodiment of a catheter-based calibration system. As described above, catheter 501 comprises calibration sheath 503. In this embodiment, however, calibration sheath is located at the distal end of catheter 501. Calibration sheath 503 additionally contains end cap 511 which measures radiation 509 and additionally serves to protect the treatment area during calibration by acting as a type of shutter. In practice, fiber 505 is inserted into calibration sheath 503, and emits radiation to be measured and sent to the calibration subsystem. End cap 511 serves to both protect tissue from irradiation during calibration and to measure forward propagating radiation during calibration. Once the calibration subsystem determines that the radiation source is properly calibrated, fiber 505 is advanced beyond calibration sheath 503, forcing open end cap 511. The treatment may then commence. End cap 511 may, for example, be a rigid piece connected to calibration sheath by a hinge or may be a flexible piece that is deformed as fiber 505 is advanced beyond sheath 503 for treatment.

The present invention is further illustrated by the following examples, but is not limited thereby.

EXAMPLE 1

Barrett's Esophagus

The following is an example of a use of the present invention, designed to illustrate the advantages of the disclosed system. Barrett's Esophagus is a pre-cancerous condition in which the normal epithelial layer of the esophagus is replaced by a metaplastic epithelial layer which predisposes a patient to certain esophageal cancers. Barrett's Esophagus is susceptible to treatment with photodynamic therapy, but requires specific treatment parameters and diffusing apparatus.

The practitioner, after diagnosis, selects a proper laser system, photosensitizer to be activated by the laser radiation, and diffuser to spread radiation evenly over the inner esophageal mucosa. In this case, the Ceralas PDT 652 nm laser, manufactured by Biolitec AG, Jena, Germany, is used. The selected photosensitizer for this wavelength is meta-tetrahydroxyphenylchlorin (mTHPC, Foscan®). Foscan is intravenously injected approximately 96 hours before laser treatment.

Preferred treatment parameters include a power density of 400 $mW/cm^2$ providing an energy density of 100 to 250 $J/cm^2$ over the affected mucosa. Radiation duration in this example is thus in the range of 250–625 seconds.

Laser settings, type of treatment, treatment duration and energy density/power settings are entered into the calibration subsystem. These treatment settings are stored in the subsystem memory so that the practitioner need not specify the settings for subsequent treatments.

A 1.5–2.5 cm diameter cylindrical diffuser is used to evenly irradiate the treatment area. The diffuser is equipped with a device such as a microchip containing identification information that will be stored in the calibration subsystem. Alternatively, the diffuser has no identification device, but the practitioner can specify the type of diffuser. The diffuser is connected to the distal end of the optical fiber or other means for delivering treatment radiation, followed by a fitting of the calibration sheath/detector apparatus over the diffuser.

The laser source is activated according to the initially entered power settings. Radiation power through the diffuser is read by the detector, which then sends that information to the calibration subsystem. Power from the laser is adjusted so that the detected power through the diffuser matches the prescribed power settings.

After calibration, the sheath/detector is removed (or a protective shutter is opened by the calibration subsystem), and treatment is performed at the proper treatment settings. In subsequent treatments with this patient/condition, calibration with this particular diffusion system is not necessary, as the information stored in the calibration subsystem will automatically detect the diffuser and properly set the laser power/wavelength with minimal input by the practitioner.

EXAMPLE 2

Laser Interstitial Thermotherapy (LITT)

Laser Interstitial Thermotherapy for soft tissue tumors is another application that would be effective in conjunction with the present invention. This method can be used in a number of soft tissue tumors, and has shown specific benefits in the treatment of liver tumors.

LITT procedures can employ a variety of applicators to deliver radiation to interstitial tumors, typically bare fiber tips, diffusers or "ITT applicators". Bare fiber use tends to be limited, due to small irradiating surfaces, high power densities, and small therapeutically effective treatment areas. Hollow cylindrical or spherical diffuser elements have been used to provide a lower power density emission and homogeneous energy distribution than is possible with bare fibers.

Because different diffuser/applicator assemblies produce different radiation patterns, it is useful to tailor treatments to different areas of the body or different tumor sizes and shapes. As such, a single laser source may require different diffusers depending on the treatment. The present invention is quite useful in this aspect, as it allows the user to interchange different diffuser assemblies without the need to manually calibrate the laser source each time a diffuser is replaced.

The calibration steps a user would undertake are similar to those described in Example 1. After identification and calibration of a new diffuser, subsequent applications with that diffuser require little input from the user beyond specifying the type or location of treatment and any unique requirements of a given treatment.

Having described preferred embodiments of the invention with reference to the accompanying drawings, it is to be understood that the invention is not limited to the precise embodiments, and that various changes and modifications may be effected therein by skilled in the art without departing from the scope or spirit of the invention as defined in the appended claims.

What is claimed is:

1. An auto-calibrating medical laser treatment system comprising:
a radiation source;
a radiation delivery system having a proximal and a distal end;
a calibration subsystem comprising a means for regulating power emitted from said radiation source, said calibration subsystem including a radiation detection means;
a removable calibration sheath surrounding at least part of said distal end of said radiation delivery system; said removable calibration sheath directing radiation to said calibration subsystem and being removed after calibration to prevent interference with radiation directed at affected tissue in an area of treatment;
either means to direct at least a preselected portion of said power emitted from said radiation source towards said calibration subsystem or means to convert at least part of said power emitted to an electrical signal compatible with said calibration subsystem; and
wherein said calibration subsystem can automatically adjust said radiation source to conform with predetermined treatment parameters.

2. The auto-calibrating medical laser treatment system according to claim 1, wherein said delivery system is an optical fiber.

3. The auto-calibrating medical laser treatment system according to claim 1, wherein said distal end of said delivery system comprises means to distribute emitted radiation.

4. The auto-calibrating medical laser treatment system according to claim 3, wherein said distribution means is selected from the group consisting of a diffusion system being a radiation diffusion device and illumination optics.

5. The auto-calibrating medical laser treatment system according to claim 4, wherein said radiation diffusion device is a diffuser located at a distal end of an optical fiber.

6. The auto-calibrating medical laser treatment system according to claim 5, wherein said diffuser is selected from a group consisting of a cylindrical diffuser, a spherical diffuser, and a balloon diffuser.

7. The auto-calibrating medical laser treatment system according to claim 1, wherein said calibration subsystem comprises a microprocessor and software designed to calibrate said radiation delivery system and said radiation source.

8. The auto-calibrating medical laser treatment system according to claim 1, wherein said calibration subsystem is permanently attached to said radiation source.

9. The auto-calibrating medical laser treatment system according to claim 8, wherein said radiation source further comprises a selection screen and means to input treatment information.

10. The auto-calibrating medical laser treatment system according to claim 1, wherein said calibration subsystem is electrically connected to said radiation source.

11. The auto-calibrating medical laser treatment system according to claim 10, wherein said calibration subsystem is a desktop computer.

12. The auto-calibrating medical laser treatment system according to claim 1, wherein said calibration sheath is detachable.

13. The auto-calibrating medical laser treatment system according to claim 4, wherein said calibration sheath comprises an outer layer to protect said diffusion system from external radiation and prevent treatment radiation from penetrating said sheath.

14. The auto-calibrating medical laser treatment system according to claim 13, wherein said calibration sheath additionally comprises an inner layer to direct said treatment radiation to said radiation detection means.

15. The auto-calibrating medical laser treatment system according to claim 1, wherein said calibration sheath is shaped to generally conform with the shape of a specific type of diffusion system.

16. The auto-calibrating medical laser treatment system according to claim 1, wherein an interior surface of said calibration sheath is reflective to said emitted radiation, and wherein said interior surface is shaped to direct all of said emitted radiation to said detection means for radiation delivery systems that produce a plurality of radiation emission distributions.

17. The auto-calibrating medical laser treatment system according to claim 16, wherein said calibration subsystem can calculate the resultant emitted power density based upon inputted factors unique to each diffusion system, and adjusts power from said source to match predetermined treatment parameters.

18. The auto-calibrating medical laser treatment system according to claim 1, wherein said radiation detection means is incorporated into an inner surface of said sheath.

19. The auto-calibrating medical laser treatment system according to claim 18, wherein said detection means is electrically connected to said calibration subsystem.

20. The auto-calibrating medical laser treatment system according to claim 1, wherein said sheath directs radiation to at least one exterior photodetector to measure the delivery system output.

21. The auto-calibrating medical laser treatment system according to claim 1, wherein said detection means is connected to said source by a means selected from a group consisting of an electrical connection, an optical connection and a radio-frequency connection.

22. The auto-calibrating medical laser treatment system according to claim 1, further comprising:
    means for storing treatment information in said calibration subsystem;
    an electronic identification means attached to said radiation delivery system;
    means for relaying identification information stored in said identification means to said calibration subsystem;
    wherein said calibration subsystem stores treatment information specific to said diffusion system for use in subsequent treatments.

23. The auto-calibrating medical laser treatment system according to claim 1, further comprising means for inputting treatment information.

24. The auto-calibrating medical laser treatment system according to claim 1, further comprising a safety shutter to prevent emission of treatment radiation from said radiation source prior to treatment.

* * * * *